United States Patent
Bonnaud et al.

(10) Patent No.: US 7,988,092 B2
(45) Date of Patent: Aug. 2, 2011

(54) VORTEX GENERATOR AT HOT GAS OUTPUT

(75) Inventors: Cyril Bonnaud, Toulouse (FR); Arnaud Hormiere, Toulouse (FR)

(73) Assignee: Airbus Operations SAS, Toulouse (FR)

(*) Notice: Subject to any disclaimer, the term of this patent is extended or adjusted under 35 U.S.C. 154(b) by 318 days.

(21) Appl. No.: 11/775,483

(22) Filed: Jul. 10, 2007

(65) Prior Publication Data

US 2008/0067292 A1   Mar. 20, 2008

(30) Foreign Application Priority Data

Sep. 18, 2006 (FR) ...................... 06 53793

(51) Int. Cl.
  *B64C 23/06* (2006.01)
  *B64D 33/04* (2006.01)
(52) U.S. Cl. ............... 244/121; 244/199.1; 244/53 R
(58) Field of Classification Search ............ 244/54, 244/199.1, 200.1, 53 R, 55, 62, 73 R, 74, 244/121, 204.1; 60/262, 264, 770; 239/265.19
See application file for complete search history.

(56) References Cited

U.S. PATENT DOCUMENTS

| | | | | |
|---|---|---|---|---|
| 4,019,696 A | * | 4/1977 | Hirt et al. | 244/200.1 |
| 4,426,054 A | * | 1/1984 | Wang | 244/212 |
| 4,466,587 A | * | 8/1984 | Dusa et al. | 244/199.1 |
| 4,653,795 A | * | 3/1987 | Soderberg | 296/193.08 |
| 4,655,419 A | * | 4/1987 | van der Hoeven | 244/200.1 |
| 6,126,118 A | * | 10/2000 | Fujino et al. | 244/199.1 |
| 6,983,912 B2 | * | 1/2006 | Connelly et al. | 244/54 |
| 2001/0028019 A1 | | 10/2001 | Cambon | |
| 2003/0201366 A1 | | 10/2003 | Connelly et al. | |

FOREIGN PATENT DOCUMENTS

FR  2 807 389  10/2001

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

A vortex-generating device is presented to reduce a thermal exposure of an aircraft to hot exhaust gases discharged from an aircraft engine. The engine also discharges cold air from a fan of the engine. The aircraft engine may be coupled to the aircraft via a support mast located on a main wing. A portion of the support mast of an aircraft engine is located near a hot gas flow being discharged from the engine. The vortex-generating device is positioned on a surface of the support mast. The device generates a vortex which crosses the hot gases and prevents the hot gas flow from reaching a heat sensitive portion of the support mast. This device is adaptable to the operating conditions of an already-built aircraft without any notable increased weight.

14 Claims, 4 Drawing Sheets

VORTEX GENERATOR AT HOT GAS OUTPUT

TECHNICAL DOMAIN

The invention relates to the field of protection against overheating caused by hot exhaust gases from an engine by the creation of a flow that deviates said gases. The invention has a particular application in aeronautics, at the level of the surface of the structure that supports the engine, for example a mast.

The invention thus relates to a method for protecting a structure located downstream from the directional evacuation of a hot gas by the implementation of a device that indirectly deviates this gas, in particular via a vortex. The invention also relates to a structural element equipped with such a vortex generator device.

STATE OR PRIOR TECHNIQUE

Although oriented in a direction fixed by an engine case, the hot exhaust gases come into contact with the adjacent parts at the output of the case. In particular, for an aircraft wherein engine 1, 1' is mounted on a mast 2, 2' (see for example document FR 2 807 389), the gases ejected by engine 1, 1' are often in contact with a part 4, 4' of the surface of the mast 2, 2' that is supporting it: see FIG. 1A.

In the design phase of a plane, the precise identification of zones 4, 4' of mast 2, 2' that will be impacted by the hot jet from the engine 1, 1' is important:

- it makes it possible to determine the part 4 of the mast 2 to be protected, for example through the use in this location at least of adapted materials, especially metal alloys 6 (FIG. 1B),
- it makes it possible to maximise the use of composite materials 8, lighter, in the zones that remain cold,
- it intervenes in the calculation of the load that structures 2 are subjected to,
- it is used for the analysis of risks linked to the presence of high temperatures in certain zones 4 of mast 2, which would be likely to be contaminated by fuel or transmission fluid vapours.

In particular, once the involved zones 4 are identified, a thermal stiffening part 6, or rear fairing of the mast, for example a metal structure generally called APF (for "Aft Pylon Fairing"), is then positioned in order to ensure the safety of the structure 2; the remainder 8 of the mast 2 can be made of material, for example composite, which offer less thermal resistance but are lighter.

Nevertheless, this identification is difficult because it must cover the entire flight domain of the plane. In addition, it brings into play complex aerodynamic and aerothermic phenomena that are still difficult to predict; certain movements of hot air occur indeed exclusively within a "boundary layer", i.e. over a very low thickness of turbulent flow between the surface of mast 2 and the cold exterior flow. Boundary layers are particularly difficult to model.

During plane test flights, the discovery is sometimes made that the protected metal zone 6 of mast 2 is not large enough and additional protection must be provided.

In the presence of this type of problem, the usual solution consists in extending the protected zone 4 of mast 2 by replacing the non-adapted materials 8 subjected to temperatures that are too high with metal alloys 6 that are more resistant to heat; the latter however are also heavier. Other than this change in material, thermal armouring may also be installed, or even additional ventilation in mast 2 if the internal temperatures are too high with regards to certification requirements.

These modifications result in an increase in the mass of the plane, which alone is already prejudicial, and in a penalty of aerodynamic drag if internal ventilation is increased. This approach also bears heavy consequences in that it implies a modification in the manufacturing processes of the affected structures, and this late in the development of the plane.

DISCLOSURE OF THE INVENTION

The invention proposes, among other advantages, to overcome the inconveniences of the existing solutions, by protecting the surface of the mast adjacent to the hot gases output of the engine without unduly making the structure of the aircraft heavier.

This invention consists in installing one or more vortex generators on the surface of the mast, near the hot region, so that the vortex crosses and modifies the path of the hot air and therefore prevents it from going into unprotected zones of the mast.

In one of its aspects, the invention thus relates to a method of protection for a mast-type structure against the flow of hot exhaust gases from an engine wherein the exhaust gases have a privileged direction and are separated from the structure by a flow of cooler gases of the same orientation. Protection is provided by setting up in a zone that is downstream of the structure at least one vortex-generating device, making it possible to partially disturb the flow of cold gases, with this disturbance causing a vortex which modifies the flow of the boundary layer of hot gases and cools it down. The vortex-generating device is a longitudinal element jutting out from the structure, and for which the orientation of the axis forms an angle with the direction of gas flow.

The method is particularly adapted for an aircraft jet engine at the output of the engine cowl and nacelle case.

In another aspect, the invention relates to an aircraft structural element including an engine support structure, the engine cowl and the nacelle surrounding the engine cowl; advantageously, the support structure is a mast, which is equipped with a thermal protection element of the APF type.

According to the invention, the structural element includes moreover a vortex-generating device positioned on the engine support structure, preferably on the thermal protection element, downstream from the engine cowl, which disturbs the flow of gasses. Several vortex-generating devices can be implemented, placed for exampled in a tiered manner along the gas flow.

The gas flow is oriented in the direction defined by the engine cowl and the nacelle; the vortex-generating device is of longitudinal shape and forms an angle, for example between 10 and 30°, preferably 20°, with the direction of the flow of the gases. The device includes a surface opposite to the surface attached to the support structure, defining a protrusion of which the height depends on the boundary layer of the hot gases; it can be in the form of a longitudinal plane, a square, or a "wing", i.e. the opposite surface is parallel for a portion of the junction surface with the structure, and secant to it for another portion. Advantageously, the length to thickness relationship of the device is approximately 4.

The invention also relates to a wing of a plane including one or more (two) elements according to the invention, each equipped with a jet engine, and attached to an airfoil.

BRIEF DESCRIPTION OF THE DRAWINGS

Other characteristics and advantages of the invention shall become clearer when reading the following description and in reference to the annexed drawings, which are provided solely for the purposes of illustration and are in no way limitative.

DETAILED DISCLOSURE OF CERTAIN EMBODIMENTS

In aircraft, a usual design provides for an attachment mast in order to form the link interface between the engine such as a jet engine and an airfoil of the aircraft. This type of attachment mast, also called EMS ("Engine Mounting Structure"), makes it possible to suspend for example a jet engine below the airfoil of the aircraft, or to mount the jet engine above the airfoil, using several attachments; it makes it possible to transmit the efforts generated by its associated jet engine to the structure of the aircraft, and also allows for the carrying of fuel, air, electrical and hydraulic systems, etc. between the engine and the aircraft.

Figure 1A:
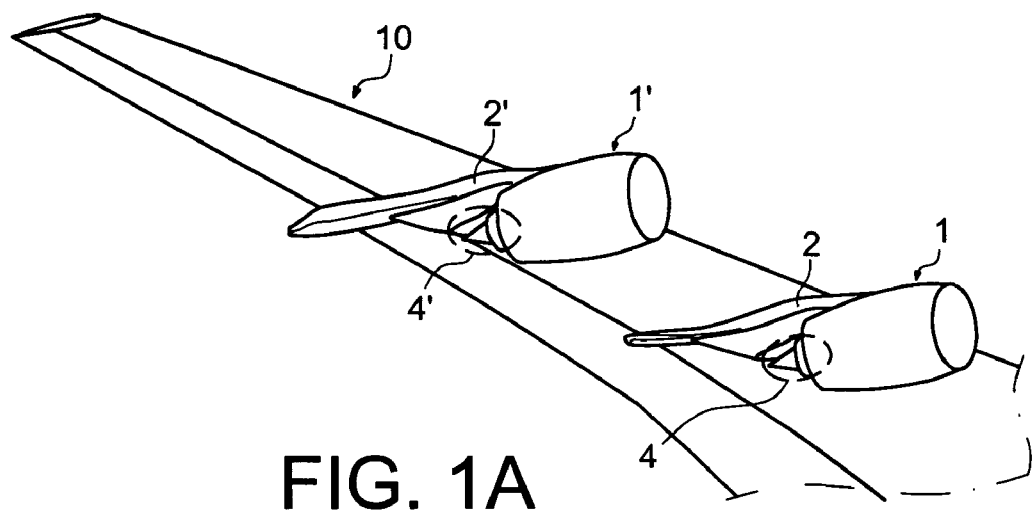
FIGS. 1A and 1B, already described, show the output of a jet engine of an aircraft.
Figure 1B:
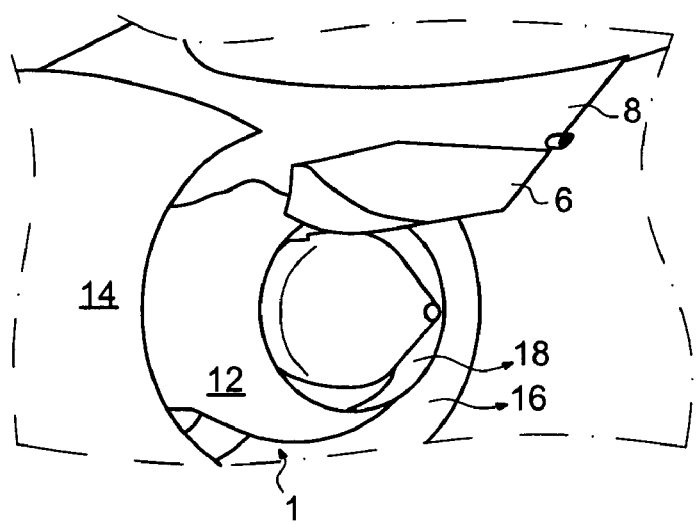

Therefore, as shown in FIGS. 1 and 2, an aircraft engine 1 is fixed under a wing 10 of the aircraft by an attachment mast 2. Jet engine 1 has in front a large-size fan casing that delimits a fan ring channel, and has towards the rear a central case that encloses the core of the jet engine 1; the central case extends towards the rear by an ejection case 12 of hot gases (or "engine cowl"); the cases 12 are attached to one another and extend along an axis AA. This unit is intended to be surrounded by a nacelle, of which the rear cowl 14 allows for the directed evacuation of the air after passing through the fan (or "jet fan" 16), which is cold.

Generally, the cold gases 16 and the hot gases 18 are ejected according to a cylinder, in the direction AA defined by casings 12, 14, with jet fan 16 forming a first protection between the hot jet 18 and the mast 2 downstream from its output. However, the hot gases are not directed unilaterally inside the ring of the cold "jet fan": they also come into contact with a zone 4 of mast 2.

Mast 2 can be made of different materials, and can in particular include a composite structure. At the level of contact zone 4 with hot gases 18, composite structure 8 does not have thermal resistance that is sufficient to ensure maximum safety. A stiffening metal structure, or APF 6 is therefore used at the level of contact zone 4.

Figure 2A:
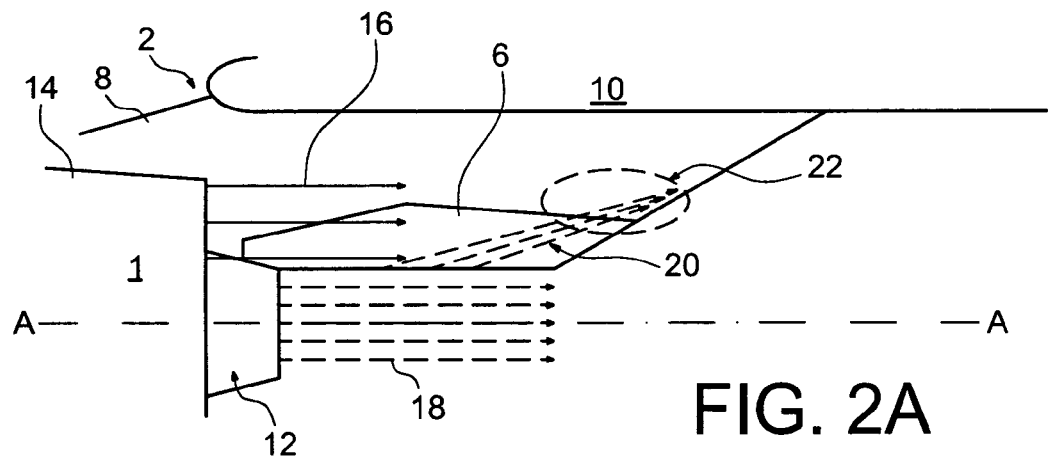
FIGS. 2A and 2B show the diagram of the flow of gases at the output of the jet engine, respectively without and with a vortex-generating device according to the invention.

It frequently appears however that during its use, hot gases 18 that exit from the engine form moreover a boundary layer 20, i.e. a thin layer along the wall of a zone downstream from mast 2, which laterally "goes back up" in the direction of movement on the side of protected zone 4 of mast 2, intermeddling between the cold jet fan 16 and the wall of mast 2: see FIG. 2A. In certain cases, this hot boundary layer 20 reaches the structures 8 that are not protected against the heat, on the upper part of the mast (the term "upper" is to be understood as relating to the end of mast 2 that is attached, either directly or via airfoil 10, to the fuselage). An unprotected region 22 of mast 2 could therefore be damaged.

According to the invention, protection for this zone 22 is provided by deviating the hot boundary layer 20. With this aim in view, a vortex-generating element 24 is positioned on the mast structure in a region in contact with the cold jet fan 16, preferably on APF 6: in the presence of this vortex generator 24, the hot jet 18, 20 of engine 1 is deviated, and does not affect unprotected zones 8 of mast 2.

Figure 2B:
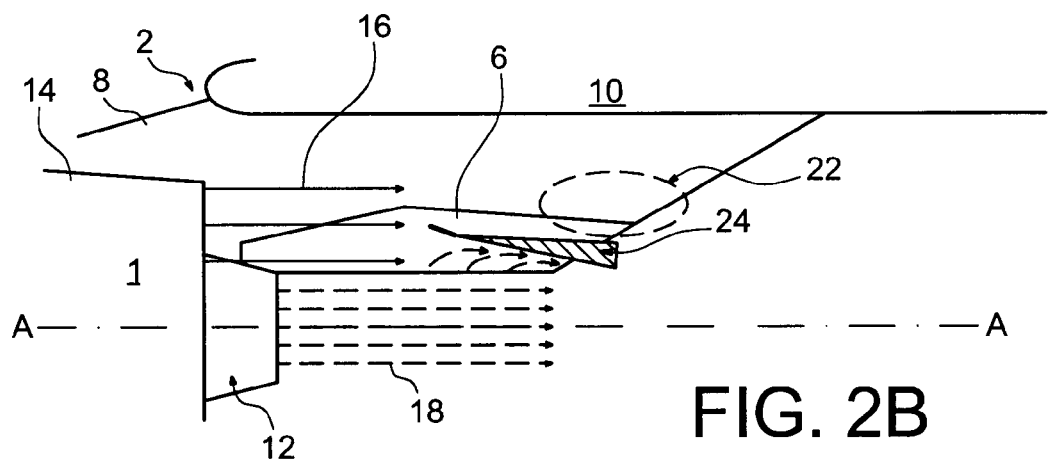
Figure 3A:
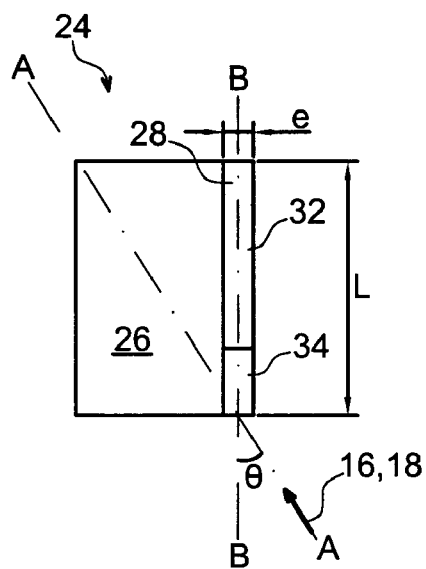
FIGS. 3A, 3B and 3C show a preferred embodiment of a device for the invention.
Figure 3B:
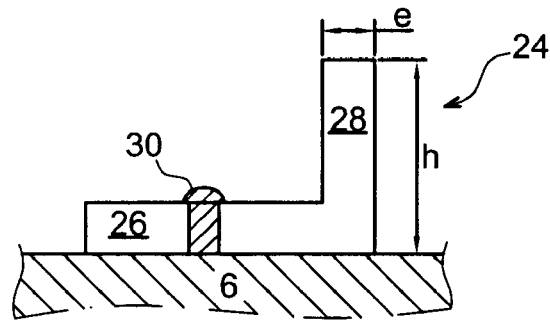

Such as shown in FIGS. 2B, 3A and 3B, the vortex generator 24 is of longitudinal shape, and extends in the direction of its length between two opposite surfaces according to an orientation BB. The first surface is attached to mast 2, and the opposite surface thus defines a longitudinal protrusion in relation to the surface of the engine support structure 2. For example, a first part 26 of vortex generator 24 is of a substantially plate shape and includes the first surface, as well as means 30 to be coupled with APF 6, through welding or riveting or gluing; a second part 28 defines the protrusion, for example in the form of a flat element of thickness e and of height h substantially orthogonal to first part 26, in such a way that the vortex generator device 24 has a substantially square form.

The vortex generator device 24 is positioned in such a way that the general direction BB of protrusion 28 forms a certain angle $\theta$, in particular between 10 and 30°, preferably 20°, in relation to the direction AA of "normal" flow of cold and hot jets 16, 18, so as to create a vortex of the cold gases 16, and this outside the boundary limit 20.

The vortex created exits downstream of the vortex generator device 24, and it crosses the hot flow contained in boundary layer 20: when crossing this hot boundary layer 20, the vortex deviates it and absorbs it by mixing it with cold air 16 coming from outside the boundary layer. Upper part 22 of the mast 2 is therefore protected.

In particular, such a vortex generator device 24 allows the temperature of shown zone 22 to reach approximately 100°, although, without protection, 250° C. would be reached.

Figure 3C:
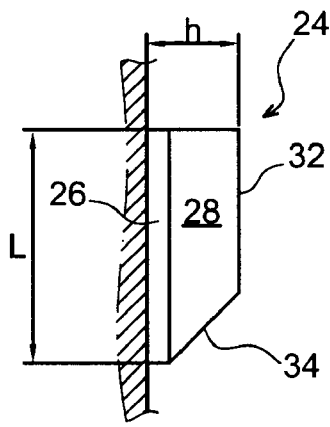

Vortex generator 24 can have different longitudinal shapes and, in a preferred embodiment shown in FIG. 3C, protrusion 28 is in the form of a wing, i.e. the opposite surface is for the downstream portion 32 substantially parallel to the connection surface with mast 2 or first flat part 26, and is secant to it for an upstream portion 34 (with the downstream and upstream portions defined in relation to the arrival zone of gases 16, 18, i.e. substantially orthogonally to longitudinal axis BB); the vortex generator 24 can also be in the form of a plane or a bar, for example in suppressing or reducing the first flat part 26. Device 24 can be metal or composite, since it is positioned in the bed of a cold air flow 18 and is therefore not subjected to high temperatures.

Height h of the vortex generator device 24 (of protrusion 28), i.e. thickness h between the two opposite surfaces, is linked to the thickness of boundary layer 20; in particular, according to the local thickness of boundary layer 20 where generator 24 is located and the length of zone 22 of mast 2 to be protected, with height h as a protrusion falling between 10 and 100 mm. Advantageously, the length L to height h ratio is about 4, and the length L to thickness e of protrusion 28 ratio is about 5 to 100.

Figure 4:
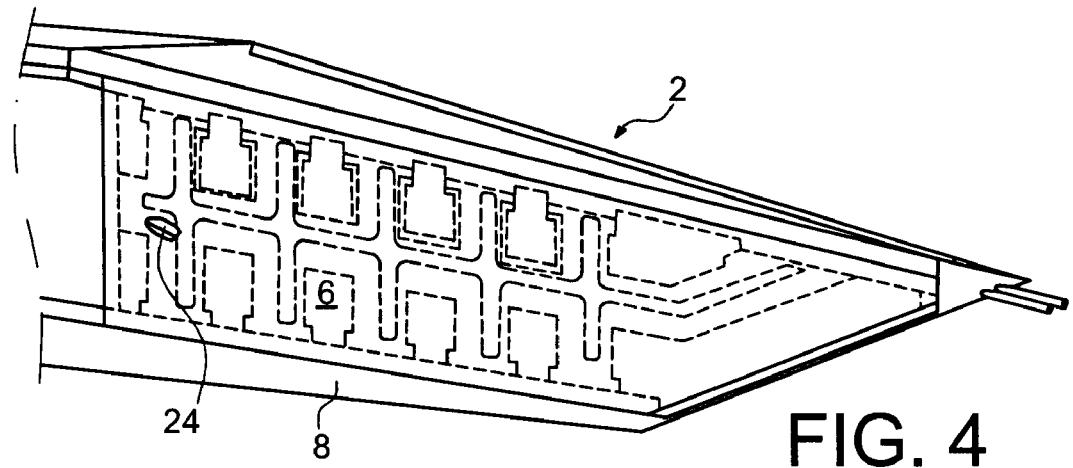
FIG. 4 shows an aircraft mast protected by a method according to the invention.

So, in order to protect certain zones of mast 2 downstream from the output of jet engine 1 against a hot flow, in addition to the presence of an APF 6 of metal alloy in certain places, a longitudinal device 24 is positioned which makes it possible to deviate the hot flow 20. An example of this embodiment is provided in FIG. 4.

It is possible to position several vortex generators 24 on both sides of mast 2, advantageously in a symmetrical manner.

Figure 5:
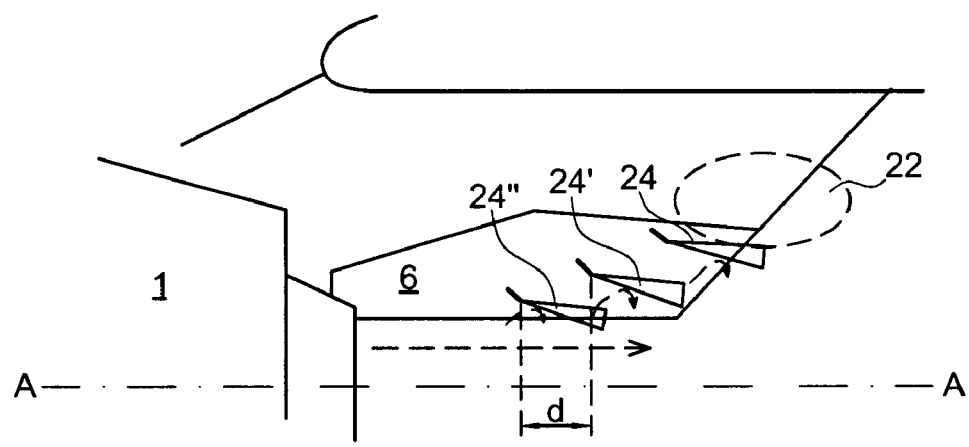
FIG. 5 shows an embodiment according to the invention with several vortex-generating devices.

Several generators 24 can also be placed along a mast 2 is a tiered manner: this configuration, shown in FIG. 5, allows the dimensions and therefore the drag induced by these devices 24, 24', 24" to be reduced. Advantageously, in order to avoid interaction of the generated vortexes and maintain tiered temperature zones, the distance d between generators 24, 24' is about 5 times their height h.

The first interest of device 24 is to bring the temperatures to the level taken into account initially when mast 2 was designed.

Another interest resides in the facility with which it can be installed on the surface of mast 2, by riveting 30, welding or gluing.

Moreover, this solution has a small impact on the manufacturing processes of mast 2 since it makes it possible to maintain the choices of materials 6, 8 that were made for the various parts of mast 2.

Finally, according to the type of mission carried out by the plane (short, average or long-haul), the penalty concerning the mass and aerodynamic drag caused by the adding of vortex generator 24 can be less than the penalty that would have resulted from applying the current state of the art.

Although described for an engine 1 supported by a mast 2 below an airfoil 10, the solution according to the invention naturally applies to other engine 1 configurations wherein the hot exhaust gases risk damaging a neighbouring structure.

The invention claimed is:

1. An aircraft having a wing, the wing comprising:
    an airfoil to provide lift;
    at least one engine assembly to provide propulsion for the aircraft, the at least one engine assembly including:
        an aircraft engine to provide propulsion to the aircraft by creating a flow of hot gases and a jet of cold air,
        an engine support structure to couple the aircraft engine to the wing, the engine support structure including a downstream zone located laterally and downstream of an exhaust output of a nacelle and of an engine cowl,
        the engine cowl to discharge the flow of hot gases in a cylindrical shape in a direction coaxial with the engine cowl, and
        the nacelle surrounding the engine cowl to discharge the jet of cold air; and
    a plurality of vortex-generating devices attached to and extending out of the engine support structure downstream of the engine cowl and the nacelle, each of the vortex-generating devices disturbing the flow of hot gases, deviating a hot boundary layer of the flow of hot gases and absorbing the hot boundary layer by mixing the hot gases with the cold air, wherein
    the plurality of vortex-generating devices are spaced apart from each other and disposed along a direction in which the flow of hot gases is discharged from the engine cowl,
    wherein each of the vortex generating devices is substantially aft of an output of the engine cowl from which the hot gases are discharged.

2. The aircraft according to claim 1, wherein the engine support structure is a mast.

3. The aircraft according to claim 1, further comprising: a means of thermal protection on the engine support structure.

4. The aircraft according to claim 3, wherein the vortex-generating devices are positioned on the means of thermal protection.

5. The aircraft according to claim 1, wherein the vortex-generating devices include:
    a first surface attached to the engine support structure,
    a second surface substantially orthogonal to the first surface defining a height of a protrusion in relation to the engine support structure, the vortex-generating devices having a square L-beam cross-section extending in a length direction of the vortex-generating devices.

6. The aircraft according to claim 5, wherein a longitudinal axis of the vortex-generating devices form an angle of approximately 10 to 30 degrees with a direction in which the flow of hot gases is discharged from the engine cowl.

7. The aircraft according to claim 5, wherein the vortex-generating devices are wing-shaped, the second surface of the vortex-generating devices including a first part substantially parallel to the first surface and a second part secant to the first surface, the first part and the second part extending along a longitudinal direction of the vortex-generating devices.

8. The aircraft according to claim 5, wherein the height of the protrusion is approximately one fourth of the length of the vortex-generating devices.

9. The aircraft according to claim 1, wherein the vortex-generating devices are contacted by the flow of cold gases.

10. The aircraft according to claim 1, wherein the vortex-generating devices disturb the flow of hot gases by generating a vortex to cross the flow of hot gases and by mixing a portion of the jet of cold air with the flow of hot gases.

11. The aircraft according to claim 1, wherein the vortex-generating devices deviate the hot boundary layer of the flow of hot gases by preventing the hot boundary layer from reaching an unprotected region of the engine support structure.

12. A method to protect an aircraft from a flow of hot gases from an aircraft engine, the method comprising:
    attaching the aircraft engine to an engine support structure located on a wing of the aircraft, the aircraft engine discharging the flow of hot gases and a jet of cold air, and the engine support structure coupling the aircraft engine to the wing;
    attaching a plurality of vortex-generating devices to the engine support structure, each of the vortex-generating devices extending out from a downstream zone of the engine support structure, disturbing the flow of hot gases, deviating a boundary layer of the flow of hot gases and absorbing the hot boundary layer by mixing the hot gases with the cold air; and
    disposing the plurality of vortex-generating devices spaced apart from each other along a direction in which the flow of hot gases is discharged from the engine cowl,
    wherein each of the vortex generating devices is disposed substantially aft of an output of the engine cowl from which the hot gases are discharged.

13. The method according to claim 12, wherein the engine support structure is a mast.

14. The method according to claim 12, wherein the vortex-generating devices form an angle within a range from 10 to 30 degrees relative to a direction in which the flow of hot gases is discharged from the engine cowl.

* * * * *